United States Patent [19]

Hirschmann et al.

[11] 3,846,398

[45] Nov. 5, 1974

[54] METHOD FOR CONTROLLED STEPWISE SYNTHESIS OF POLYPEPTIDES UTILIZING N-THIOCARBOXY ANHYDRIDES OF AMINO ACIDS AS REAGENTS

[75] Inventors: Ralph F. Hirschmann, Scotch Plains; Robert G. Denkewalter, Westfield, both of N.J.

[73] Assignee: Merck & Co., Inc., Rahway, N.J.

[22] Filed: Mar. 1, 1971

[21] Appl. No.: 120,062

Related U.S. Application Data

[63] Continuation of Ser. No. 830,174, April 17, 1969, abandoned, which is a continuation of Ser. No. 545,855, April 28, 1966, abandoned.

[52] U.S. Cl. ............................................ 260/112.5
[51] Int. Cl. ...................... C07c 103/52, C08h 1/00
[58] Field of Search ...................... 260/112.5, 306.7

[56] References Cited
UNITED STATES PATENTS

| | | | |
|---|---|---|---|
| 2,638,467 | 5/1953 | Heilbron et al. | 260/112.5 |
| 2,649,458 | 8/1953 | Bennett et al. | 260/112.5 |

FOREIGN PATENTS OR APPLICATIONS

| | | | |
|---|---|---|---|
| 903,785 | 8/1962 | Great Britain | 260/239.1 |

OTHER PUBLICATIONS

Grant et al., J. Am. Chem. Soc., 86, 3870 (1964).
Bartlett et al., I, J. Am. Chem Soc. 79, 2153 (1957).
Bartlett et al., II, J. Am. Chem. Soc. 79, 2159 (1957).
Knobler et al., J. Chem. Soc., 1964, 3941.
Bailey, Nature, 164, 889 (1964).
Aubert et al., J. Chem. Soc. 1951, 2195.

Primary Examiner—Lewis Gotts
Assistant Examiner—Reginald J. Suyat

[57] ABSTRACT

The invention disclosed herein relates to a novel process for the controlled, stepwise synthesis of polypeptides and proteins. More particularly, it is concerned with a process for the rapid and efficient preparation of polypeptides in which multiple sequential steps are carried out without isolation of intermediate peptides. This process for the controlled stepwise synthesis of polypeptides involves reacting a starting amino acid or peptide (or derivative thereof) with an N-thiocarboxy amino acid anhydride (or derivative thereof) in an aqueous medium under conditions of controlled pH such that the only amino group present in appreciable concentration in reactive form during the course of the reaction is the amino group in the starting amino acid or peptide.

7 Claims, No Drawings

3,846,398

METHOD FOR CONTROLLED STEPWISE SYNTHESIS OF POLYPEPTIDES UTILIZING N-THIOCARBOXY ANHYDRIDES OF AMINO ACIDS AS REAGENTS

This application is a continuation of Ser. No. 830,174, filed Apr. 17, 1969, now abandoned, which is a continuation of Ser. No. 545,855, filed Apr. 28, 1966, now abandoned.

Polypeptides are a large class of chemical compounds comprising dipeptides, tripeptides, tetrapeptides and higher peptides in which amino acids are joined one to the other by amide linkages (peptide bonds). A very large number of them have been isolated by partial hydrolysis of proteins. A few high molecular weight polypeptides have been prepared chemically. Many relatively low molecular weight polypeptides containing, for example, up to six to eight amino acids have been prepared. Proteins are largely polypeptides usually containing one hundred or more amino acid segments joined together.

Polypeptides are useful not only as stepping stones for the synthesis of proteins but also because certain of them are therapeutically active. They also are useful in the study and analysis of proteins. One of the most fruitful approaches to the study of protein structure has been partial hydrolysis of the protein followed by isolation and analysis of the polypeptide fragments produced. Such procedures provide a very limited amount of information regarding the structural-functional relationships and requirements in polypeptides and proteins. Exact information of this nature could be obtained by the synthesis of polypeptides in a controlled stepwise manner.

Moreover, such studies as have been carried out do not give insight into the mode of action of enzymes, hormones and other proteins with important body functions. Neither do they give information which might permit the preparation of useful variants of natural proteins, nor any information which will permit the preparation of therapeutic agents specifically tailored to interact with natural proteins in a useful way.

One of the most challenging problems of modern biology is to gain new insight into the mode of action of enzymes, hormones and other physiologically active proteins. Relatively little is known about the relationship between chemical structure and biological activity of these important substances. For example, there is a paucity of information about specific activity sites in enzymes, the reasons for the specificity and the functions of those sections of the enzymes which seem to have no apparent role in enzymatic reactions. Not one single enzyme has ever been chemically synthesized. The presently available methods are completely inadequate for gaining insight into these chemical structure-biological activity problems since they can not be used without the expenditure of many man years efforts to prepare the large number and varied analogs of naturally occurring physiologically active substances which would be required to gain such insight. With such insight the treatment of diseases could be reduced to a more rational basis.

Although a number of synthetic methods have been proposed, no ideal method for the synthesis of polypeptides has yet been discovered which permits the formation of successive peptide bonds in a growing peptide chain and which avoids the often difficult step of selective removal of the protecting groups without the necessity of isolation of intermediates at each successive step. Such methods as have been employed have been tedious, expensive and time consuming. For the formation of a simple dipeptide by the reaction between two different amino acids, best known prior art methods require blocking the amino group of one amino acid and usually the carboxyl group of the other so that selective reaction will take place to produce only the desired dipeptide from among the four potential products. In addition the carboxyl group which is to react generally requires activation by conversion to an acid halide or some other modification which is more reactive then the carboxyl-group. The two molecules are then condensed to form the dipeptide and finally the blocking groups are removed. The reactions then, require (1) placement of the blocking groups, (2) activation of the carboxyl group, (3) condensation, and (4) removal of the blocking groups. The whole process must be repeated to add just one more amino acid to the dipeptide, and repeated again and again to add successive amino acid segments. Moreover, to prepare polypeptides for truly meaningful study it is usually necessary to minimize racemization of the amino acids and peptides as much as possible during these reactions so as to prepare substantially optically pure products. When these problems are considered together with the fact that overall yields in peptide synthesis are very low and the fact that there are over $10^{26}$ possible polypeptides containing only twenty different amino acid segments, it is small wonder that, despite the recognized importance of such products, very few large polypeptides and simple proteins have actually been prepared. Such products as have been prepared have required several man years for completion. The preparation of insulin was worked on by several groups of scientists throughout the world and its successful synthesis was the result of ten years efforts on the part of one of these groups.

A method which has received considerable attention for the uncontrolled synthesis of homopolymers such as polyalanine and polyglumatic acid of varying molecular weights and for uncontrolled synthesis of heteropolymers with randomly arranged amino acid segments is the N-carboxy anhydride procedure, referred to herein as the NCA method. These polymerization reactions have been carried out in organic solvents using catalytic amounts of base. The products prepared bear a superficial resemblance to natural proteins in some of their physical properties but are of practically no value in the study of the chemical and physiological properties of proteins. Moreover, the procedures are not applicable to the preparation of heteropeptides of known structure and molecular weight containing specifically defined amino acids in predetermined positions in the peptide chain.

Others, because of the ease with which homopeptides are formed have speculated that the NCA method might be applicable to the controlled, stepwise synthesis of heteropeptides. In fact early attempts were made to adapt the method to the synthesis of low molecular weight heteropeptides in organic solvents. The method has never been used in aqueous media in the controlled, stepwise synthesis of heteropeptides in which two or more amino acids have been added in successive steps to a growing peptide chain. It has, in fact, been the conclusion of those who have suggested such successive reactions that stepwise synthesis of polypeptides by the NCA method is impossible because the relative rates of the main reaction and the side reactions could not be controlled.

By contrast, no suggestions or attempts have been reported of the use of the thio analogs of N-carboxy amino acid anhydrides in which the ether oxygen is replaced with sulfur for the controlled, stepwise synthesis of heteropeptides. These analogs have not even been employed in the uncontrolled synthesis of homopeptides, of substantial molecular weight.

We have found that those thio analogs can be advantageously employed for the controlled, stepwise synthesis of heteropeptides. The compounds may be generally represented by the formula:

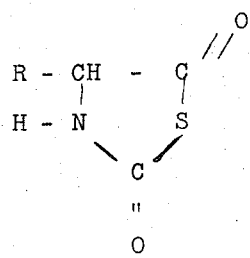

in which R is an amino acid residue. They are substituted thiazolid - 2,5-diones and may be regarded as N-thioanhydrides of amino acids. For convenience we shall refer to them herein as N-thiocarboxy amino acid anhydrides and to the method of synthesis as the TCA process.

In accordance with our method, a starting amino acid is first converted to an N-thiocarboxy amino acid anhydride. This conversion has two advantages. It blocks the amino group and activates the carboxyl group at the same time. The thioanhydride is then reacted with another amino acid or peptide to form an N-thiocarboxy dipeptide or higher peptide which converts to the desired compound on dethiocarboxylation. We have found that in accordance with process conditions more fully explained below, it is possible to control these reactions so as to produce the desired products with minimum production or interfering side products.

The use of aqueous media would be ideally suited for controlled, stepwise synthesis of polypeptides for a number of reasons. A principal reason is that amino acids and peptides are generally soluble in aqueous media and not in organic solvents because they form ionic species, and because, in the case of peptides, they contain hydrophilic amide groups. It is also worth noting that peptides and proteins found in nature are almost always in aqueous media.

It is most unexpected to find that it is possible to control the TCA process in aqueous media in the stepwise synthesis of heteropeptides since it would be anticipated that such control would be complicated by difficulties due to (1) polymerization, (2) over-reaction, (3) hydrolysis of TCA and (4) interference with the reaction by liberated carbonyl sulfide. Polymerization and over-reaction would arise from premature dethiocarboxylation of the intermediate N-thiocarboxy compound so that the product produced would be available to compete with the selected starting material for reaction with the N-thiocarboxy anhydride reactant. Similarly, hydrolysis of the starting thioanhydride would lead to incompleteness of reaction due to insufficiency of starting thioanhydride. Carbonyl sulfide liberated from any one of the intermediates could react preferentially with the starting material and inactivate it to cause incompleteness of reaction.

Another difficulty which would be expected in adapting the TCA procedure to stepwise synthesis is really another aspect of the problem of control. It is the difficulty of purification. Unless each successive step in a peptide synthesis is effected so as to control polymerization, incompleteness of reaction and over-reaction, the reaction media becomes contaminated with undesired byproducts including reaction products of lesser or greater molecular weights particularly those differing from the desired peptide product by only one or two amino acids. Contamination may also arise from the production of peptides having the same molecular weight but the wrong sequence from that in the desired peptide product. The physical and chemical properties of these by-products are so similar to those of the desired product that separation is extremely difficult and often impossible. Of course, some contaminants can be tolerated, especially those which because of differences in physical and chemical properties are easily separated from the desired product. Insoluble polymers are readily separated by filtration.

We have discovered that the TCA method can be used to achieve peptide synthesis simply and rapidly in water in a controlled, stepwise manner with or without isolation of intermediate peptide products to produce polypeptides such as oxytocin, vasopressin, angiotensin or bradykinin and proteinaceous substances such as adrenocorticotropin and insulin. In addition, the invention allows the synthesis of higher peptides and proteins including enzymes and hormones which could not be produced by heretofore employed methods.

The basic process of this invention for the controlled synthesis of peptides and derivatives thereof comprises reacting as a starting material an amino compound selected from the group consisting of amino acids, peptides and derivatives thereof containing a free amino grouping, with an N-thiocarboxy amino acid anhydride or derivative thereof by bringing the reactants together in an aqueous medium under controlled conditions such that the only amino group present in appreciable concentration in reactive form during the course of the reaction is the amino group of the amino acid, peptide or derivative which should react to form the desired product, and any other amino group present including those in the peptide product as formed is not, a key discovery of this invention. Under the carefully controlled conditions of this invention, the reaction between the thioanhydride and the amino acid, peptide or derivative proceeds at each step of the synthesis with minimum formation of those by-products which would interfere with the next thioanhydride reaction or with the purification of the desired product. Under the controlled conditions, the intermediate N-thiocarboxy compound is prevented from dethiocarboxylating, or if dethiocarboxylation does take place the resulting amino group is protected by protonation, until substantially all of the starting material has reacted with the thioanhydride. The result of this careful control is that the reaction with the fastest rate is the one which produces the desired product and the production of unwanted side products, especially those resulting from over-reaction and polymerization is maintained within limits which do not interfere with subsequent steps in the controlled synthesis. Following decomposition of the N-thiocarboxy intermediate or any unreacted thioanhydride, the peptide product so formed can be further reacted with another thioanhydride under similar reaction conditions without isolation of intermediates. The invention is broadly applicable to the preparation of dipeptides in yields which are normally as high as 95 to 98 percent and are often essentially quantitive, as well as to the preparation of polypeptides and proteins of predetermined structure.

The desired result, i.e., the formation of a new peptide bond is obtained by bringing together the thioanhydride and the starting material in separate phases, conveniently by addition of solid thioanhydride to an aqueous solution of the starting material, under controlled conditions of temperature, rate of mixing and hydrogen ion concentration such that the only free amino group present in reactive form in reactive concentration is the amino group which is to join in the formation of the peptide bond and the amino group of the product as formed is protected. Organic solvents, both miscible and immiscible with water can be employed as carriers for either reactant if desired. Aqueous dioxane is especially suitable.

In the reaction mixture for the preparation of a peptide one or more amino groups may be present in addition to the amino group which must react to form the desired product. These might include, for example, additional basic groups on the thioanhydride, such as the epsilon amino group of lysine, the guanadino group of arginine or the imido group of tryptophane. They might also include amino groups on the amino acid or peptide used as a starting material. The amino group of the product, i.e., the amino group generated by the dethiocarboxylation of the intermediate thiocarbamate, must also be considered. Any or all of these groups are potentially capable of interfering with the course of the desired reaction by competing for the starting reagent, i.e., the N-thiocarboxy anhydride. It is apparent therefore that the concentration of these potentially interfering groups in their reactive forms as free amines must be kept at a minimum.

For simplicity the discussion will be limited to only two amino groups, A and B. Amino group A is the group which is to react to form the desired product. Amino group B is the potentially interfering group. Several situations might arise depending upon the relative basicity of the two groups. If B is a much stronger base than A, reaction can be effected at a pH at which most of B will be protected by protonation and most of A will be non-protonated and therefore reactive. However, the pH must be high enough so that the thiocarbamate does not decompose prematurely. For the same reason, if the amino group of the formed product generated upon the dethiocarboxylation of the thiocarbamate is significantly more basic than the amino group of the starting material, the reaction should be conducted at a pH, so that the product amino group and amino group B are protected by protonation and amino group A is not.

If A and B are substantially similar in basicity, then it is not generally possible to increase the concentration of amino group A relative to amino group B by pH adjustment and B must be protected by a blocking group, suitably a carbobenzoxy group. The pH of the reaction, however must still be selected so that other potentially competing amino groups are protected by protonation.

If A is a significantly stronger base than B, the reaction is carried out at a high pH, for example 9 to 10. Under these conditions, group A is in substantial concentration as a free amine. Even though B is present as a free amine the product formed will be the desired product produced by reaction with amino group A.

In both of the last two cases, the pH should be sufficiently high to stabilize the thiocarbamate. The pH should ordinarily be maintained below 11. Control of pH is critical since above a pH of about 10 the concentration of hydroxyl ion is sufficiently high so that competitive reaction with the N-thiocarboxy anhydride occurs.

In some instances it is not necessary to protect the B amino group. This is often the case with high molecular weight polypeptides where a potentially interfering group is un-reactive due to steric factors.

The reaction is carried out at a protecting pH. The term "protecting pH" encompasses that range of hydrogen ion concentration at which the amino group to react is in appreciable concentration in reactive form i.e. the form of a free amino group reactive with acylating agents; potentially interfering amino groups are protected; the intermediate thiocarbamate is stabilized or the amino group resulting from its dethiocarboxylation is protonated. It also includes controlling the pH so that hydrolysis of the N-thiocarboxy amino acid anhydride is minimized.

There is an optimum protecting pH for each reaction. Depending upon the particular reaction, this pH may fall between 4 and 10.0. For reactions in which the thiocarbamate is the protecting group the optimum protecting pH is on the alkaline side, ordinarily from 7.5 to 10. We have discovered that in the case of peptide reactants, the protecting pH for substantially complete reaction may be substantially lower than that for amino acid reactants. If the product is one in which the amino group is protected by protonation the optimum protecting pH is on the acid side, ordinarily from about 4 to 6. Once determined the reaction should be carried out under conditions in which the pH is controlled as closely as possible to the optimum protecting pH. Variations in pH may be followed by a fast responding electrode, and it is convenient to control the pH by automatic titration or by external addition of neutralizing reagent. Even with these precautions it is often difficult because of the high rate of reaction to maintain the pH at exactly the optimum protecting pH. Some variation from the optimum protecting pH is acceptable. Preferably, however, the pH will not vary more than 0.2 units from the optimum protecting pH although variation by as much as 0.5 units may be tolerated.

Probe reactions may be used to determine the protecting pH and as well as the optimum conditions with respect to concentration, temperature, time and molar excess of anhydride which are useful for carrying out the process of this invention. For example, in the preparation of a polypeptide, probe reactions may run with aliquots of the reaction mixture to prepare the next higher member of the series at a number of different pH's concentrations, temperatures, reaction times and molar excesses of thioanhydride. The results are evaluated by determination of ninhydrin color using conventional procedures of thin layer chromatography and paper chromatography with various solvent combinations such as n-butanol-acetic acid-water, sec-butanol-acetic acid-water, pyridine-isoamyl alcohol-water, phenol-water and isoamyl alcohol-water. The product may be located by using any of a number of color reactions, e.g., the ninhydrin reaction.

It is also convenient to utilize radioactive tracer techniques in analyzing the probe reactions. Such techniques allow ready determination of the $R_f$ value for each new product as well as a convenient method for estimating the yield of product and the percent contamination with side products. For example, in the preparation of a high molecular weight polypeptide using radioactive techniques, each new radioactive product can be subjected to the next step in the synthesis under a variety of reaction conditions and the reaction products subjected to chromatographic analysis and analysis based on measurements of radioactive activity. In this manner the reaction conditions which will give the best yields can be ascertained. For this reason radioactive N-thiocarboxy amino acid anhydrides of each of the commonly used amino acids are prepared and used in prove runs. A convenient reaction quantity for the probe reaction is 1.0 millimole of reactants per 15 ml. of aqueous mixture. It is especially useful to prepare a series of labeled compounds for each amino acid labeled with $C^{14}$ carbon, deuterium and with both isotopic elements. These isotopes can be differentially measured by known techniques. It is thus possible to determine the exact identity of the product.

An advantage of the TCA process compared with the NCA process is that the control techniques required in the former process are less demanding. For example, in the NCA process reaction is normally complete in less than a minute. Due to this rapid reaction it is often difficult to follow and control changes in hydrogen ion concentrated during the course of the reaction. In contrast, the TCA reaction may be carried out over a period of from about ten minutes to about four hours depending upon the temperatures employed, and the identity of the specific reactants amongst other factors.

If desired, the course of the reaction can be followed by subjecting aliquots to the known hydroxamic test and reaction may be continued until the test is negative indicating that substantially all of the N-thiocarboxy anhydride has reacted.

Amongst the control conditions critical to the present invention, is our discovery that by carrying out each reaction under conditions of intimate mixing, for example with rapid stirring side reactions can be largely eliminated, often with the result that the yields are essentially quantitative. In addition, rapid mixing assures that the N-thiocarboxy anhydride will not react in areas locally depleted in starting material to hydrolyze or polymerize. Similarly rapid mixing facilitates the dissolution of the N-thiocarboxy anhydride and avoids premature decomposition of the intermediate thiocarbamate, an undesirable side reaction leading to both overreaction and inactivation of starting material.

The temperature range employed in the TCA process is broader than in the NCA process and usually varies from about 0°C to about 40°C, although temperatures somewhat above or below the stated temperatures may be employed without adverse effects. It is often convenient to effect reaction at room temperature, i.e., about 20°C to 30°C. The possibility of obtaining products at room temperature without undue accumulation or side products is a special advantage of the TCA process.

If one of the reactants is an amino acid the preferred reaction conditions are from 0°C to 25°C during a period of from about 10 to 30 minutes. If the reactant is glycine the preferred reaction time is reduced by a factor of 10, that is to from about 1 to 3 minutes. Peptides are somewhat slower in their reaction, and the preferred conditions are from about 15 minutes to 4 hours at a temperature of from 0°C to 25°C.

Equimolar quantities of reactants can often be employed. When the thioanhydride is partially consumed by hydrolysis it is often preferred to use it in excess to insure complete conversion of starting amino acid or peptide to product. The optimum excess can be determined by probe reactions. The degree of excess which may vary within wide limits is conveniently varied depending on factors such as the nature of the thioanhydride and the molecular weight and basicity of the peptide or equivalent reactant. As the molecular weight of the peptide product increase, the use of excess thioanhydride becomes less and less of a problem because the physical and chemical properties of the desired product differ appreciably from those resulting from hydrolysis of the excess thioanhydride so that isolation and purification of the polypeptide product can be readily effected.

A special advantage of the process of this invention is the ease of removal of the protecting group. Thus, when the reaction is carried out at a pH such that the product is protected by protonation, dethiocarboxylation occurs spontaneously. With thiocarbamates which are stable under alkaline conditions dethiocarboxylation is readily effected by reducing the pH by the addition of acids.

When the intermediate requires dethiocarboxylation, it is most conveniently accomplished by adjusting the hydrogen ion concentration of the reaction medium to an acid pH, for example from about 3 to about 5. Often dethiocarboxylation may be effected by allowing the mixture to stand, by slight heating or by freeze drying. These are not preferred procedures however, because of the time involved and because the thiocarbamates of some products are too stable to decompose without the addition of acid. Bubbling an inert gas such as nitrogen through the mixture during dethiocarboxylation will aid in the complete removal of carbonyl sulfide as it forms.

After dethiocarboxylation, an additional amino acid or derivative can be added to the peptide chain by repeating the above-described procedure.

There are a number of methods which can be employed to aid in the control of pH. For example the reaction can be carried out in a buffer. Any of a number of buffering systems can be employed, the selection of a particular buffer being indicated by the protecting pH determined in the probe reaction. Borate and phosphate buffers can be used. Potassium borate is especially useful for maintaining an alkaline pH.

Barium hydroxide is a convenient base for pH control since the barium ion can be readily removed from the reaction mixture by percipitation with an acid such as sulfuric acid. An advantage of this procedure is that a large proportion of the inorganic salts are removed so that they do not accumulate over the course of several successive steps and thereby complicate the purification of the final product.

External addition of a base, suitably sodium or potassium hydroxide can be used to maintain close control during the course of a reaction, for example when the change of pH is being followed with a pH meter. Often such addition will be used in conjunction with a buffer.

When operating under the conditions described above, polypeptides of predetermined structure can be prepared by successive reactions of an amino acid, peptide or derivative thereof with the selected N-thiocarboxy anhydride, dethiocarboxylating the resulting N-thiocarbamate if necessary, and repeating the reaction without isolation of the products formed as many times as is necessary in the original reaction medium until the polypeptide product having the desired chain length and structure is obtained. It is also convenient to react an N-thiocarboxy anhydride of one peptide with another peptide to obtain high molecular weigh polypeptides of accurately known structure.

Normally, the polypeptide, since it is amphoteric, will be soluble under acidic and basic conditions. Occasionally, however, the structure of the formed product is such that it will precipitate under the conditions of the reaction or on subsequent pH adjustment. In such event it is often good practice to isolate the product by filtration and perform subsequent reactions in fresh aqueous media. Often peptides containing a high proportion of amino acids with aromatic groups such as phenylalanine or tyrosine will precipitate from acid solution following dethiocarboxylation. In some instances thiocarbamate salts of polypeptides are insoluble in the basic media in which they are formed and precipitate. It is possible to prepare thallium salts of thiocarbamates which may be precipitated for purification. These salts can be separated by filtration and dethiocarboxylated in fresh aqueous acid before subsequent reaction with another anhydride.

As has been previously emphasized, the process of this reaction produces the desired products of excellent purity in high yield with a minimum accumulation of side products. Such side products as are produced are generally sufficiently different in chemical and physical properties so as not to interfere substantially with successive reactions. It is, however, good practice to separate desired intermediates from time to time, for example after five to fifteen reactions. Often the structure of the peptide prepared is such that it may be very conveniently separated from accumulated by-products. For example, a peptide containing arginine or other basic amino acid in the peptide can be readily purified by contact with a cationic ion exchange resin, for example a carboxylic resin such as Amberlite IRC 50 on the acid cycle at a pH at which the peptide and by-products are selectively adsorbed and eluted. The eluate containing the peptide may be used as the reaction medium for subsequent reaction with another thioanhydride. Analogous procedures can be employed with peptides containing dicarboxylic amino acids.

The final products and intermediates prepared by the process of the invention can be isolated in any convenient manner, for example by crystallization; salting out, for example with ammonium sulphate or by adjusting the pH to the point where the product precipitates. Chromatographic separation using silica gel, ion exchange resins, or molecular sieve chromatographic agents such as the crosslinked dextrans available in a variety of forms under the tradename Sephadex from A. B. Pharacia of Uppsala, Sweden can be employed. One very convenient procedure is to prepare the final product with an easily removed 'handle,' e.g., a strongly basic group which will readily react with an ion exchange resin or other reagent to separate the desired product from the by-products. The 'handle' is then removed. For example, if the desired product is a hexapeptide, it is convenient to prepare a heptapeptide with arginine as a carboxy terminal amino acid. The arginine is strongly basic and, as a result, the heptapeptide is readily adsorbed on a cationic ion exchange resin so as to effect separation from the by-products. The heptapeptide is then eluted and subjected to the action of the enzyme carboxypeptidase-B which selectively removes the arginine leaving the desired hexapeptide.

A procedure which is especially useful for the isolation of products is a capillary flow chromatographic technique. The process is similar to thin layer chromatography on a large scale. An effort is made to reproduce the conditions of thin layer chromatography as closely as possible, only with larger quantities of reagents. The same ratio of absorbent to amino acid or peptide is maintained.

In the process a column is packed with silica gel, cellulose or other suitable adsorbent. A solution containing the peptide is contacted with the lower portion or upper portion of the column and allowed to develop. It has been observed that $R_f$ values of the components of the reaction mixture substantially parallel the $R_f$ values for the same components as determined by thin layer chromatography. The appropriate portion of the column containing the desired product, as previously ascertained by thin layer methods, is then simply cut out and eluted. As an alternative the surface of the column can be sprayed with ninhydrin or some other reagent which will effect a color change to locate the product. The column is then sectioned, the colored surface layer is scraped away and the product eluted from the remaining portion of the section.

The process of this invention is applicable to amino acids and peptides, both natural and synthetic in both the dextro and levo form. It may be used with compounds having functional groups other than the amino and carboxyl groups which join to form the desired peptide bond such as tyrosine, arginine, threonine, glutamic acid and the like. It is applicable also to derivatives in which these additional functional groups are blocked with a group which is readily removed subsequent to peptide formation, such for example as N-thiocarboxy anhydrides of imbenzyl histidine, trifluoro acetyl serine, trialkylsilyl serine or tetrahydropyranyl-tyrosine. The term "derivatives" as used herein also includes within its scope amides, esters, and other functional modifications of the carboxylic group of the amino acid or peptide and homologs or analogs of natural amino acids in which one or more hydrogen atoms is substituted, for example with a lower alkyl group such as -methylleucine or -fluoro glycine. These latter compounds are especially useful in analyzing structure-activity relationships in physiologically active proteins such as hormones, and in preparing antagonists for such active proteins for various therapeutic applications. The process of the invention may be used to prepare physiologically active derivatives of primary and secondary amines, thioalcohols and compounds obtained from phosphorus containing acids such as phosphate esters.

Because of their structure certain of the amino acids require special consideration in the process of this invention.

The imidazole nitrogen of the N-thiocarboxy anhydride of histidine may be protected prior to reaction by the formation of an im-benzyl derivative which can be removed from the peptide by hydrogenation or by the action of sodium in liquid ammonia. The imidazole group of this amino acid does not appear to interfere with subsequent reactions with anhydrides once the peptide is formed.

The hydroxyl group in serine and in threonine thioanhydrides is conveniently blocked by forming trifluoro acetyl, trichloroacetyl or trimethylsilyl derivatives. These groups are especially suitable since they are hydrolytically removed during the formation of the peptide. Hydroxy groups can be protected by the formation of ethers, for example, benzyl ether; tetrahydropyranyl ether or other acetal or ketal.

It is a feature of this invention that unexpectedly the thioanhydrides of aspartic and glutamic acids and of histidine may be utilized without protecting their additional functional groups.

Cystine which is a dithio amino acid with symmetrical α-amino carboxylic acid moieties on either side of the disulfide linkage is utilizable in this invention in a unique manner to produce two identical polypeptides each containing cysteine, an amino acid containing only one sylfhydryl group. In the process a symmetrical di-n-thiocarboxy anhydride of cystine is reacted with a starting amino acid, peptide or derivative to produce a symmetrical product with at least one peptide bond on each side of the disulfide linkage. For example the di-N-thioanhydride of cystine may be reacted with alanine to produce bis (alanyl) cystine. Thereafter the chain growth is continued as described above, for example, stepwise reactions with the thioanhydrides of leucine and valine to produce bis (leucyl-valyl-alanyl) cystine. When a polypeptide having the desired molecular structure has been prepared the compound is reduced, for example, with hydrogen sulfide, thioglycollic acid or equivalent reducing agent to split the disulfide link thereby forming two identical molecules of the desired polypeptides each containing cysteine. In the suggested example the product would be leucyl-valyl-alanyl-cysteine.

The novel process of this invention is readily adaptable to the preparation of a series of analogs of long chain proteins such as enzymes or hormones in which one amino acid in the middle of the chain is varied. For example, if the 10th amino acid of a polypeptide containing 20 amino acid is to be varied to prepare analogs in which all of the other amino acids are retained in the same sequence, it is convenient to first prepare a series of peptides containing 9 amino acids and a second series containing 10 amino acids. The members of the first series will be converted to various decapeptides by reaction with N-carboxy amino acid thioanhydrides of a variety of amino acids. Each of the thus produced decapeptides can be coupled with decapeptides from the second series to produce polypeptides containing 20 amino acids in which the only variable is one amino acid in the middle of the chain. Coupling can be effected by conventional procedures such as the carbobenzoxy method, in which the carbobenzoxy group is eliminated from the product by hydrogenation.

The process of this invention can also be used in conjunction with the NCA process, that is the process in which N-carboxy amino acid anhydrides are utilized rather than N-thiocarboxy amino acid anhydrides. We have discovered that N-carboxy amino acid anhydrides can be advantageously employed in processes similar to those described above. Normally the N-carboxy anhydrides and the intermediates formed when they are used to prepare peptides are less stable than N-thiocarboxy anhydrides and the analogous intermediates. Consequently, as discussed above, lower temperatures and shorter reaction periods will be employed with syntheses utilizing N-carboxy anhydrides than are used for N-thiocarboxy anhydrides. The use of both N-carboxy anhydrides in conjunction with N-thiocarboxy anhydrides in the preparation of heteropeptides is illustrated in the examples.

The N-thiocarboxy amino acid anhydrides used in the process of this invention are prepared by cyclizing an alkyl thionourethane derivative or an amino acid, for example by treatment with a phosphorus thihalide such as phosphorus tribromide. The thionourethane is prepared by reaction between an amino acid and a dialkyl or dialkaryl xanthate, preferably the former. The process may be represented as follows:

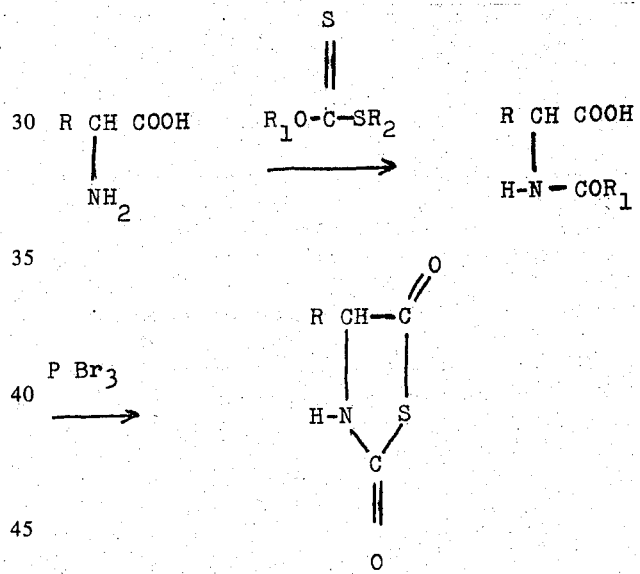

In the foregoing equations R is an amino acid residue, and the $R_1$ and $R_2$ which may be the same or different are lower alkyl or aralkyl groups containing, for example, up to eight carbon atoms.

The following preparation of N-thiocarboxy amino acid anhydrides may be regarded as illustrative of the preparation of the desired compounds.

Preparation I

N-thiocarboxy leucine anhydride

A total of 52.5 g. of leucine is taken up in 34.2 ml. of 45 percent ethanolic potassium hydroxide and 10 ml. of water is added. To the solution there is added 48.9 g. of dimethyl xanthate in 40 ml. of methanol. The two phase system is warmed to about 50°C to form a single phase system with the evolution of methyl mercaptan. The solution is held at 50°C for about 90 minutes and concentrated to remove most of the ethanol. The residue is diluted with 100 ml. of water and washed twice with 100 ml. portions of ethyl acetate to remove unreacted xanthate. The aqueous layer is added to 200 ml. of ethyl acetate containing 34 ml. of concentrated hydrochloric acid and an additional 50 ml. of water is added. By this treatment the potassium salt of N-thiocarbalkoxy leucine is converted to the desired acid and extracted into organic layer. The aqueous is washed with additional ethyl acetate and the combined organic layers washed twice with 40 ml. portions of saturated sodium chloride solution, dried over anhydrous sodium sulfate and filtered. The filtrate is concentrated at reduced pressure to a viscous oil which crystallizes on standing. The product may be purified by taking up in warm benzene and precipitating by the addition of benzene.

To convert the thus prepared N-thiocarbethoxy leucine to N-thiocarboxyl leucine anhydride a total of 5 g. is taken up in 20 ml. of benzene and 2 ml. of phosphorus tribromide is added. The mixture is warmed to about 40°C with swirling. The mixture is then cooled to crystallize the desired product which is recovered by filtration, washed with cold benzene and water, and dried.

Preparation 2

N-thiocarboxy glycine anhydride

A total of 60 g. of glycine is taken up in 18 ml. of water and 75 ml. of ethanolic potassium hydroxide (11.7N) and 97.5 g. of dimethyl xanthate is added. The reaction mixture is maintained at about 25°C for 2 hours. The mixture is then heated to about 45° for one half hour and concentrated at low pressure to remove most of the ethanol. The concentrate is diluted with 180 ml. of water and extracted with two 100 ml. portions of ether to remove unreacted xanthate. The alkaline aqueous layer is overlayered with 150 ml. of ethyl acetate and 73 ml. of 12 N hydrochloric acid together with 70 ml. of water is added. The aqueous layer is separated and again extracted with 100 ml. of ethyl acetate. The combined organic layers are washed twice with 50 ml. portions of saturated sodium chloride solution and dried over sodium sulfate. The drying agent is removed by filtration and the filtrate concentrated at a low pressure to yield methyl thionourethane glycine which is purified by taking up a 150 ml. of ethyl acetate, filtering and precipitating the desired product by the addition of 350 ml. of hexane.

The thus prepared methyl thionourethane glycine (8g.) is taken up in 40 ml. of tetrahydrofuran and 6.1 ml. of phophorus tribromide is added slowly while maintaining the temperature between 25° and 35°C. The reaction mixture is quenched in 200 ml. of 10 percent aqueous sodium bicarbonate and 100 ml. of ethyl acetate. The combined organic layers are washed successively with two 30 ml. portions of saturated sodium chloride solution, dried over anhydrous sodium sulfate, filtered and then the solvent removed from the filtrate at low pressure to provide the desired product. The product is purified by taking up in 150 ml. of benzene, filtering, and precipitating by the addition of 150 ml. of hexane to the filtrate.

Preparation 3

N-thiocarboxy phenylalanine anhydride

A total of 5.06 g. of ethyl thionourethane, phenylalanine is prepared as in Preparation 2 by replacing the glycine with an equivalent quantity of phenylalanine is taken up in 25 ml. of benzene, the mixture is cooled to about 3°C and treated dropwise under nitrogen with a solution of 0.95 ml. of phosphorus tribromide in 5 ml. of benzene. After addition of the phosphorus tribromide solution the mixture is stirred for an additional 20 minutes at the same temperature while a slurry containing the desired trioanhydride forms. This slurry is added to a mixture of 50 ml. of ethyl acetate and 50 ml. of water. The organic layer is separated and washed with a 50 ml. portion of water. It is then dried over anhydrous sodium sulfate, filtered and the filtrate taken to dryness at reduced pressure. The residue is taken up in benzene and the desired product precipitated by the addition of cyclohexane. It is purified by recrystallization from benzene and cyclohexane.

Various modifications may be made in these basic procedures to take into account extra functional groups on certain of the amino acids. For example, the hydroxyl group on tyrosine can be protected with the tetrahydrofuranyl protecting groups. The aliphatic hydroxy group on threonine and serine can be protected with trifluoroacetyl or trichloroacetyl groups. Dicarboxylic acids such as aspartic and glumatic can be employed as half esters with the omega carboxyl groups esterified. The omega amino group of diamino acids such as lysine can be protected with alkoxy carbonyl or aralkoxycarbonyl groups such as methoxycarbonyl or benzoxycarbonyl groups.

The process of this invention can also be used in conjunction with the NCA process. That is the process in which N-carboxy amino acid anhydrides are utilized in place of N-thiocarboxy amino acid anhydrides. In this process an amino acid, peptide or derivative thereof is reacted with an N-carboxy amino acid anhydride or derivative by bringing the reactants together in a aqueous medium under conditions of controlled pH such that the only amino group present in appreciable concentration in active form during the course of the reaction is the amino group which is to participate in the reaction. An intermediate N-carboxy peptide forms and is decarboxylated. Decarboxylation is generally effected by adjusting the pH to from about 3 to 5. The original reactants are brought together with good agitation at a temperature which is normally from about −5° to about 10°C, at a pH of from about 4 to 11 (preferably 8–10.5), during a period which is generally less than a minute and rarely exceeds 3 minutes. At the end of the reaction period the intermediate is decarboxylated by the addition of acid, preferably a mineral acid such as sulfuric or hydrochloric. The use of N-carboxy amino acid anhydrides in conjunction with N-thiocarboxy amino acid anhydrides in the controlled, stepwise synthesis of heteropeptides is illustrated in the examples.

The following examples are given by way of illustration only and should not be considered as limitations of this invention.

Example 1

Phenylalanyl-glycyl-glycyl-leucine

To a mixture of 2 m moles of leucine in 20 ml. of aqueous potassium borate buffer at pH 10 at 25°C there is added 2.05 m moles of solid N-thiocarboxy glycine anhydride with rapid stirring. Reaction is continued for 1 minute and the pH adjusted to 5 with concentrated sulfuric acid to effect dethiocarboxylation while passing a stream of nitrogen through the mixture for about 10 minutes to produce glycyl-leucine which is not isolated.

The process is repeated at pH 10 during a reaction period of 10 minutes using g 2.02 m moles of N-thiocarboxy glycine anhydride to produce glycyl-glycyl- leucine which is not isolated.

The pH of the mixture is adjusted to 9.5 by the addition of concentrated potassium hydroxide and 2.1 m moles of N-thiocarboxy phenylalanine anhydride is added at 25°C with rapid stirring. After 30 minutes the pH is adjusted to 4 while a stream of nitrogen is passed through the mixture. The desired tetrapeptide forms and is isolated by salting out with ammonium sulfate.

By replacing the N-thiocarboxy phenylalanine anhydride with the appropriate hydride and repeating the foregoing procedure, the following compounds are prepared:
Valyl-glycyl-glycyl-leucine
Isoleucyl-glycyl-glycyl-leucine
Alanyl-glycyl-glycyl-leucine Example 2

Tyrosyl-leucyl-phenylalanine

To a mixture of 3 m moles of phenylalanine in 30 ml. of aqueous potassium borate buffer at pH 10 there is added 3.2 m moles of solid N-thiocarboxy leucine anhydride with rapid stirring. The temperature is increased to 40°C and held for 10 minutes. It is then cooled and the pH adjusted to 3 with concentrated sulfuric acid at 0°C. While passing a stream of nitrogen through the mixture. The product leucyl-phenylalanine is not isolated.

The pH of the mixture is adjusted to 10.0 by the addition of concentrated potassium hydroxide and 3.4 m moles of tetrahydropyranyl-tyrosine-N-thiocarboxy anhydride added with rapid stirring while maintaining the temperature at approximately 25°C. Reaction is continued for 20 minutes and the dethiocarboxylation effected by adjusting the pH to 3 with sulfuric acid. The mixture is allowed to stand for 1 hour to remove the protecting group. The desired product is isolated chromatographically on a silica gel column.

The same compound is prepared by repeating the above procedure utilizing ethoxyethyltyrosine-N-carboxy anhydride.

Example 3

Valyl-leucyl-alanyl-cysteine

A mixture of 2 m moles of cystine in 30 ml. of aqueous potassium borate buffer at pH 10 is maintained at about 10°C; while 4.1 m moles of N-thiocarboxy alanine anhydride is added with rapid stirring. Reaction is continued for 15 minutes and the pH adjusted to 3 with dilute hydrochloric acid at 2°C while a stream of nitrogen is passed through the mixture. The resulting product, bis (alanyl) cystine is not isolated.

The pH of the mixture is adjusted to 10.2. It is cooled to 0°C and 4.2 m moles of N-thiocarboxy leucine anhydride added with rapid stirring. Reaction is continued for 1 hour and dethiocarboxylation effected by adjusting the pH to 3.5 while passing a stream of nitrogen through the mixture. The intermediate bis (leucyl-alanyl) cystine is not isolated, but is treated with 4.3 m moles of N-thiocarboxy valine anhydride at 25°C with rapid stirring and dethiocarboxylated with sulfuric acid at pH 3 to afford bis (valyl-leucyl-alanyl) cystine which is salted out of the reaction mixture.

The product is reduced with hydrogen sulfide to produce valyl-leucyl-alanyl-cysteine.

EXAMPLE 4

Lysyl-glycyl-glycyl-leucine acetate

Glycyl-glycyl-leucine is prepared in accordance with the procedure of Example 2 and the reaction mixture containing it is treated with 2.5 m moles of solid epsilon carbobenzoxy-N-thiocarboxy lysine anhydride at 0°C with rapid stirring over a period of 2 hours. Dethiocarboxylation is effected with sulfuric acid in the presence of nitrogen at pH 4. The product E-carbobenzoxylysyl-glycyl-glycyl-leucine is salted-out of the mixture and recovered by filtration.

The carbobenzoxy group is removed by hydrogenation and the product isolated by removal of the solvent at reduced pressure after filtration of the Raney nickel catalyst.

Example 5

Glycyl-phenylalanyl-leucine

A solution of 40 mM of leucine in 400 ml. of 0.45 M boric acid buffer is adjusted to pH 10.5 at 2°C with 50 percent sodium hydroxide in a blender under nitrogen. To the stirred solution there is rapidly added 35 mM of N-carboxy phenylalanine anhydride while maintaining the pH at 10.5 with the addition of 50 percent sodium hydroxide. The mixture is filtered and the colorless filtrate acidified to pH 5.4 with 50 percent sulfuric acid while bubbling nitrogen through the solution. The product phenylalanyl-leucine precipitates and is recovered by filtration.

A mixture of 2 mM of phenylalanyl-leucine in 10 mM of 0.45 M boric acid buffer is adjusted to pH 9.5 at 4°C by the addition of 50 percent sodium hydroxide under nitrogen. To the stirred mixture there is added 2.1 mM of N-thiocarboxy glycine anhydride while maintaining the pH at 9.5 by the addition of 50 percent sodium hydride. After stirring for 10 minutes at about 4° C the mixture is filtered and the pH adjusted to 5.5 with 50 percent sulfuric acid while bubbling nitrogen through the mixture. The desired product, glycyl-phenylalanyl-leucine is recovered by filtration.

Example 6

N-methyl-leucyl-glycyl-glycyl-glycyl-glycyl-isoleucine

To a mixture containing 4 mM of glycyl-glycyl-glycyl-glycyl-isoleucine in 30 ml. of aqueous potassium borate buffer at pH 9.5 there is added 4.3 mM of N-methyl leucine N-thiocarboxy anhydride with rapid stirring. The mixture is maintained at 40°C for 1 hour with rapid stirring, cooled and the pH adjusted with concentrated sulfuric acid to 3.1 to effect dethiocarboxylation in the presence of nitrogen. The desired product is isolated by passing the solution over a carboxylic resin and subsequently eluting with ammonium hydroxide solution.

Example 7

Glycyl-prolyl-phenylalanyl-arginine

A total of 2.0 mM of arginine hydrochloride is taken up in 200 cc. of potassium borate buffer, the pH reduced to 3.0 while bubbling nitrogen through the mixture to expel carbon dioxide and then adjusted to 10.5 by the addition of aqueous potassium hydroxide. The mixture is cooled to 0°C and 25 g. of ice added followed by 3.82 g. of N-thiocarboxy phenylalanine anhydride. The mixture is stirred rapidly in a blender for two hours. The pH is adjusted to 3 with sulfuric acid to effect dethiocarboxylation.

The pH is then increased to 10 by the addition of potassium hydroxide and the procedure repeated at 25°C during a reaction period of 30 minutes with 2.02 mM of N-thiocarboxy proline anhydride. The pH is adjusted to 3.0 with sulfuric acid for dethiocarboxylation.

The procedure is repeated with 2.02 mM of N-thiocarboxy glycine anhydride at 20°C and an initial pH of 9.5 during a 15 minute reaction period. The pH is adjusted to 7 with sulfuric acid and the mixture allowed to stand for approximately 16 hours to effect dethiocarboxylation.

The reaction mixture is diluted 10 fold to a total of 10 liters and passed over a 800 ml. IRC–50 column during a period of 18 hours. The column is washed with 4 liters of water at a flow rate of 15 ml./min. The column is eluted with 0.35 N sulfuric acid and the eluate collected in 300 ml. fractions. The fractions giving a positive ninhydrin test are freeze dried, the solids content combined, and extracted with methanol until the extracts fail to give a ninhydrin test. The extracts which give a positive ninhydrin test are combined and evaporated to dryness in vacuo. The residue is taken up in the minimum amount of dilute sulfuric acid at pH 4.5 and a precipitate formed by the addition of 5 volumes of methanol followed by 10 volumes of ethanol. The precipitate is recovered by filtration, dissolved in water and again precipitated with the same amounts of methanol and ethanol. The precipitated product glycyl-prolyl-phenylalanyl-arginine is isolated and washed with methanol and ether.

Example 8

S-benzyl-cysteinyl-glycyl-glycyl-glycine

A total of 19 mM of glycine is taken up in 200 ml. of potassium borate buffer at pH 9 and 19 mM of N-thiocarboxy glycine anhydride added.

The mixture is maintained at 10°C with rapid stirring for one minute. The pH adjusted to 3 with sulfuric acid to dethiocarboxylate. The pH is then increased to 8.5 with potassium hydroxide and the process repeated with 19.5 mM of N-thiocarboxy glycine anhydride during a reaction period of 1–5 minutes.

To the solution containing glycyl-glycyl-glycine at pH 10 there is added 22 mM of S-benzyl-N-thiocarboxy cysteine anhydride and 50 g. of ice, and the mixture is stirred for 4 hours. The pH is adjusted to 5.5 with sulfuric acid and the mixture passed over a 100 ml. carbon column. The column is washed with 200 ml. of water and then with 800 ml. of 5 percent acetic acid. Elution is effected with 5 percent acetic acid in 50 percent acetone. The eluate is evaporated in vacuo to leave the desired product as a residue. It is recrystallized from acetone water.

Example 9

Alanyl-alanyl-alanyl-alanyl-glycine

To a solution of 80 mM of glycine in 4 liters of sodium borate buffer at pH 8.5 at 0°C there is added 80 mM of N-thiocarboxy alanine anhydride with rapid stirring. After 3 minutes the pH is lowered to 3 to effect dethiocarboxylation while passing a stream of nitrogen through the mixture. The pH is increased to 10 with 50 percent aqueous sodium hydroxide and the above reaction repeated 3 times, except that the reaction periods are 30 minutes, 1 hour and 2 hours respectively. Upon final dethiocarboxylation at pH 3 a precipitate forms which is crystallized by dissolving in aqueous sodium hydroxide at pH 11 and lowering the pH to 5.5. The identity of the compound is established by elemental analysis and by Spinco amino acid hydrolysis.

Example 10

Bradykinin

The following table illustrates the procedure by which the nonapeptide arginyl-prolyl-glycyl-phenylalanyl-seryl-prolyl-phenylalanyl-arginine is produced in accordance with the process of this invention. The table lists the step by step sequence by which N-carboxy anhydrides or N-thiocarboxy anhydrides are successively added to produce the desired product. The initial reaction is between 1 mM of arginine and 1 mM of N-carboxy phenylalanine anhydride in 10 ml. of aqueous medium buffered with boric acid at pH 10.5. The reaction pH is maintained by the addition of 50 percent aqueous sodium hydroxide during the reaction period. The intermediate prolylphenylalanyl-arginine is isolated following final decarboxylation at pH 3 by initially freeze drying the mixture and then taking the residue up in methanol. The methanol solution is chromatographed on a silica gel column and the desired tripeptide eluted with 20 percent aqueous methanol containing sufficient acetic acid so that the pH is 5. This tripeptide is converted to the desired nonapeptide by successive reactions without isolation of intermediates. In the first reaction 1 mM of tripeptide in 5 mM of water is reacted with an equivalent quantity of N-thiocarboxy serine anhydride at pH 9.0 and at a temperature of 4°C during a reaction period of 30 minutes. The condition for the second reactions are listed in the table in which the pH is controlled using solid barium hydroxide. Dethiocarboxylation is effected at the end of each reaction with concentrated sulfuric acid. The barium sulfate with precipitates is removed by filtration before continuing to the next reaction. The final product of this series of reactions is a soluble sulfate solution of bradykinin which is converted to the free base and isolated chromatographically on IRC–50, a sulfonic acid ion exchange resin by gradient elution with aqueous acetic acid.

TABLE I

| Step | Reagent | Substrate | Conc. | pH | Temp. | Time |
| --- | --- | --- | --- | --- | --- | --- |
| 1 | Phe NCA | Arg. | 1mM/10ml. | 10.5 | 0°C | 1 min. |
| 2 | Pro NCA | Phe-arg. | 1mM/10ml. | 10.0 | 0°C | 1 min. |
| 3 | Ser TCA | * | 1mM/5ml. | 9.0 | 4°C | 30 min. |
| 4 | Phe TCA | * | 1mM/5ml. | 9.5 | 25°C | 1 hr. |
| 5 | Gly TCA | * | 1mM/5ml. | 9.0 | 4°C | 10 min. |
| 6 | Pro TCA | * | 1mM/5ml. | 9.0 | 25°C | 30 min. |
| 7 | Pro TCA | * | 1mM/5ml. | 9.0 | 25°C | 30 min. |
| 8 | Arg TCA | * | 1mM/5ml. | 9.5 | 25°C | 1 hr. |

*Substrate the previously prepared peptide.

EXAMPLE 11

Use of Carboxypeptidase-B

This example illustrated the procedure by which arginine is removed from a peptide using carboxypeptidase-B.

These mixtures are prepared as follows: (1) 100 cc. of tris buffer (0.1 m in sodium chloride and 0.2 m. in trihydroxymethyl amino methane) at pH 7.65, (2) 8.5 mg. of leucyl-alanyl-glycyl-prolyl-phenylalanyl-arginine sulfate in 3.3 cc. of the same buffer, (3) 10 cc. of enzyme mixture by diluting 0.015 cc. of a carboxypeptidase-B mixture containing 10 mg. of enzyme per ml. with the same buffer.

The mixtures are mixed as follows:
2 cc. of mixture (1)
1 cc. of mixture (2)
1 cc. of mixture (3)
and incubated at 37°C for 1 hour.

The mixture is then subjected to thin layer chromatography on silica gel and two spots are observed. One is arginine, the other is the pentapeptide.

When this reaction is carried out on a preparative scale, the solutions are mixed in the same ratio and the incubation mixture freeze dried, extracted with methanol, the methanol solution conventrated to dryness, the residue taken up in water and the product isolated from the aqueous solution chromatographically on IRC–50.

Example 12

Glycyl-leucyl-phenylalanyl-($C^{14}$) arginine

This example illustrates the preparation of a labeled peptide.

A mixture is prepared containing 0.392 mg. of uniformly labeled $C^{14}$ arginine (0.5 millicurie) in 5.0 ml. of 0.01 N hydrochloric acid and 421 mg. of non-labeled arginine in 20 ml. of 1 M potassium borate buffer at pH 10.5. A 0.2 ml. aliquot is withdrawn. To the mixture there is added a 5 percent molar excess of the N-thiocarboxy anhydride of phenylalanine in one portion with rapid blending at a temperature of from 25°–30°C and blending is continued for 15 minutes while maintaining the pH between 10 and 10.5 by the addition of 5 N potassium hydroxide. At the end of the reaction period a drop of capryl alcohol is added as an antifoaming agent. The pH is then reduced to 3.5 by the addition of concentrated sulfuric acid and nitrogen is passed through the mixture for ten minutes. The pH is raised to 10.2 with concentrated potassium hydroxide, and a 0.1 ml. aliquot of the reaction mixture containing phenylalanyl ($C^{14}$) arginine is withdrawn.

To the resulting mixture, a 6.5 percent molar excess of the N-thiocarboxy anhydride of leucine is added with rapid stirring at a temperature of from 25°–30°C. Reaction is continued for 20 minutes while maintaining the pH at 9–9.5 with 5 N potassium hydroxide. Dethiocarboxylation is effected at pH 3.0 in the same manner as described above. The pH is next increased to 10.2 with concentrated potassium hydroxide and a 0.1 ml. aliquot containing leucyl-phenylalanyl-($C^{14}$) arginine withdrawn for analysis.

The tripeptide is converted to the N-thiocarboxy peptide of glycyl-leucyl-phenylalanyl-($C^{14}$) arginine by the addition of 8 percent molar excess of the N-thiocarboxy anhydride of glycine to the reaction mixture at 15°C with rapid stirring. Reaction is continued for 30 minutes while maintaining pH 9.8–10 with 5 N potassium hydroxide, and the N-thiocarboxy peptide decarboxylated at pH 3 as described above. The pH is increased to 10.2 with aqueous concentrated potassium hydroxide and a 0.1 ml. aliquot containing the desired compound withdrawn for analysis.

Each of the aliquots collected above is chromatographed on paper using the system butanolacetic acid-water in the ratio 4:1:5. The chromatograms are scanned with a radioactivity strip scanner. The results indicate that each of the desired reactions proceeds in greater than 85 percent yield to produce a product which is substantially uncontaminated by side reactions.

The reaction mixture is freeze dried, the residue extracted 3 times with 150 ml. fractions of methanol and the combined fractions concentrated to dryness in vacuo at 40°C. The residue is taken up into 2 ml. of water and one-fourth of the solution is diluted to 1 l. This diluted solution is chromatographed on 200 ml. of a carboxylic ion exchange column (CG–50 available from Rohm & Haas, Philadelphia, Pa.; 2.2 cm. diameter; 55 cm. height) on the hydrogen cycle. The column is fed with the solution at 2.5 ml. per minute and subsequently washed to collect 2 l. of water. The column is eluted with 0.01 N sulfuric acid. The efluent stream is monitored for $C^{14}$ isotope using an anthracene column, initially fed at a rate of 0.2 ml. per minute. The feed rate is gradually increased to 0.6 ml. per minute during a period of 20 hours and the rate kept constant to the end of the run. The eluent is collected in 24 ml. fractions and the desired product is obtained by combining the fractions having the expected isotopic content for the tetrapeptide by adjusting the pH to 9.5 with 50 percent aqueous sodium hydroxide and freeze drying. The residue is extracted with methanol, the extract concentrated to dryness in vacuo at 40°C. The residue is dissolved in a small amount of water, and the pH adjusted to 3.5 with concentrated hydrochloric acid. The solution is freeze dried to give the desired product which is recrystallized from water-ethanol.

Example 13

Histidyl-Alanyl-Leucyl-Glycyl-Isoleucine

To a mixture containing 4 mM. of alanyl-leucyl-glycyl-isoleucine in 30 ml. of aqueous potassium borate buffer at pH 9.5 there is added 4.3 mM. of N-thiocarboxy histidine anhydride hydrobromide with rapid stirring while maintaining the temperature at 15°C. The mixture is maintained at this temperature for 20 minutes and the temperature is then reduced to about 3°C. The pH is adjusted to 3.1 to affect dethiocarboxylation and purged with nitrogen. The pH is adjusted to 7 and the desired product isolated chromatographically on silica gel.

Example 14

Phenylalanyl-Leucine

A solution of 40 mM. of leucine in 400 ml. of 0.45 M boric acid buffer is adjusted to pH 10.5 at 2°C with 50 percent sodium hydroxide in a blender under nitrogen. To the stirred solution there is rapidly added 35 mM. of N-carboxy phenylalanine anhydride while maintaining the pH at 10.5 with the addition of 50 percent sodium hydroxide. The mixture is filtered and the colorless filtrate acidified to pH 5.4 with 50 percent sulfuric acid while bubbling nitrogen through the solution. The product phenylalanyl-leucine precipitates and is recovered by filtration.

What is claimed is:

1. The process for the controlled stepwise synthesis of peptides and protected derivatives thereof which comprises reacting a starting amino compound selected from the group consisting of amino acids, peptides, and derivatives thereof wherein additional functional groups are protected, with a TCA reagent selected from the group consisting of N-thiocarboxy amino acid anhydrides, and derivatives thereof wherein additional functional groups are protected, said reaction being conducted by bringing together said amino compound and said TCA reagent in an aqueous medium while maintaining the pH at the protecting pH (whereby the only amino group present in appreciable concentration in reactive form during the course of the reaction is the amino group of the starting amino compound which is to participate in the reaction with the said TCA reagent) thereby forming the corresponding N-thiocarboxy peptide, and dethiocarboxylating by acidification, standing, heating or freeze-drying said N-thiocarboxy peptide.

2. The process as defined in claim 1 wherein the reaction is conducted at a protecting pH of from about 4 to about 11.

3. The process for the controlled stepwise synthesis of peptides and protected derivatives thereof which comprises adding a TCA reagent selected from the group consisting of N-thiocarboxy amino acid anhydrides, and derivatives thereof wherein additional functional groups are protected, to an aqueous medium containing a pH controlling buffer and a starting amino compound selected from the group consisting of amino acids, peptides, and derivatives thereof wherein additional functional groups are protected, under conditions of intimate mixing at a protecting pH of from 4 to 10 (such that the only amino group present in appreciable concentration in reactive form during the course of the reaction is the amino group of the starting amino compound which is to participate in the reaction with the said TCA reagent) thereby forming the corresponding N-thiocarboxy peptide, and reacting resulting peitide (following dethiocarboxylation by acidification, standing, heating or freeze-drying) with TCA reagent as defined hereinabove under reaction conditions as aforesaid.

4. The process as defined in claim 3 wherein the pH controlling buffer is a borate buffer, and wherein the protecting pH, designed for stabilization of the carbamate protecting group, is from about 7.5 to about 10.

5. The process, as defined in claim 3, for the controlled stepwise synthesis of peptides and protected derivatives thereof which comprises adding a TCA reagent selected from the group consisting of N-thiocarboxy amino acid anhydrides, and derivatives thereof wherein additional functional groups are protected, to an aqueous medium containing a starting amino compound selected from the group consisting of amino acids, peptides, and derivatives thereof wherein additional functional groups are protected, under conditions of intimate mixing at a protecting pH of from 4 to 6 (such that, using protonation to protect amino, the only amino group present in appreciable concentration in reactive form during the source of the reaction is the amino group of the starting amino compound which is to participate in the reaction with the said TCA reagent) thereby forming the corresponding N-thiocarboxy peptide, and reacting resulting peptide (following dethiocarboxylation by acidification, standing, heating or freeze-drying) with TCA reagent as defined hereinabove under reaction conditions as aforesaid.

6. The process, as defined in claim 3 for the controlled stepwise synthesis of peptides and protected derivatives thereof which comprises adding a TCA reagent selected from the group consisting of N-thiocarboxy amino acid anhydrides, and derivatives thereof wherein additional functional groups are protected, to an aqueous medium containing a starting amino compound selected from the group consisting of amino acids, peptides, and derivatives thereof wherein additional functional groups are protected, under conditions of intimate mixing while concurrently adding sufficient alkaline reagent to said medium to maintain a protecting pH (so that the only amino group present in appreciable concentration in reactive form during the course of the reaction is the amino group of the starting amino compound which is to participate in the reaction with the said TCA reagent) thereby forming the corresponding N-thiocarboxy peptide, and reacting resulting peptide (following dethiocarboxylation by acidification, standing, heating or freeze-drying) with TCA reagent as defined hereinabove under reaction conditions as aforesaid.

7. The process as defined in claim 1 wherein the reaction is conducted by adding a mixture of said TCA reagent together with said starting amino compound to said aqueous medium under conditions of intimate mixing and at the protecting pH.

* * * * *